3,441,539
CONDENSATION PRODUCTS OF UREA, A SATURATED ALDEHYDE OF 3–4 CARBON ATOMS AND FORMALDEHYDE AND PROCESS FOR MAKING THEM
Helmut Karl Schafer and Rudolf Kohlhaas, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 10, 1964, Ser. No. 381,890
Claims priority, application Germany, July 19, 1963, F40,276
Int. Cl. C08g 9/10; C05c 9/02
U.S. Cl. 260—69   4 Claims

ABSTRACT OF THE DISCLOSURE

A novel condensation product of urea, a saturated aldehyde, having 3–4 carbon atoms and formaldehyde has been provided which is especially suitable as a fertilizer in a granulated form. The product is obtained by condensing (a) urea, (b) a saturated aldehyde having from 3 to 4 carbon atoms, and (c) formaldehyde. The mole ratio of the three components, $a:b:c$, being, respectively, $2:0.8-n$ to $2-n$, wherein "$n$" is 0.05 to 1. The condensation is effected by means of sulfuric acid and by keeping the reactant mixture in a plastic phase throughout the entire reaction.

---

The present invention relates to condensation products of urea and aldehydes and to a process for making them.

It has already been proposed to use condensation products of urea and various aldehydes for making nitrogenous fertilizers that are not leached out by rain and releases their content of nitrogen gradually to the plant. These known compounds have various disadvantages. Some of them do not meet the requirements as to their solubility. Others are obtained by the known manufacturing processes (condensation in a solvent, filtration and drying) in the form of powders giving off dust which renders their use in agriculture extremely difficult or even impossible. These compounds can be converted into the desired form of freely flowing granules only by further process steps with the addition of granulating agents. Many of the products are very difficult to granulate.

Now we have found that granulated co-condensates of urea with at least two different aldehydes can be obtained by condensing (a) urea, (b) an aldehyde of 3 to 4 carbon atoms, and (c) formaldehyde in a granulating apparatus in a manner such that the reaction mixture is present in the plastic phase throughout the entire reaction the mole ratio of the $a:b:c$ components being, respectively, $2:0.8-n$ to $2-n:n$, and wherein $n$, in moles, is 0.05 to 1. The formaldehyde may be wholly or partially used in the form of solid polymer paraformaldehyde or in the form of an aqueous formaldehyde solution.

The reaction product is obtained directly in the form of granules. After the condensation has been terminated the granules may be hardened by indirect heating in the same apparatus or may be conveyed for this purpose to a following drying apparatus. In the latter case, fine and oversize grains may be removed by sieving and returned to the granulating apparatus. To accelerate the reaction, catalytic amounts of mineral acids and, if desired, of water may be added. The process may be carried out fully continuously.

As starting products for the co-condensates to be obtained by the process of the invention there may be used aldehydes having 3 to 4 carbon atoms, for example propionaldehyde or butyraldehyde, in a molar ratio of urea: aldehyde within the range of $2:(0.8$ minus $n)$ at one end of the range to $2:(2$ minus $n)$, at the other end of the range, and $n$ mole of formaldehyde. The value $n$ mole may be within the range of 0.05 to 1 mole, advantageously 0.08 to 0.15 mole. The formaldehyde may be used in the form of solid polymer paraldehyde and/or in the form of a concentrated aqueous formaldehyde solution.

The reaction may be carried out in mixing or granulating devices such as, for example, paddle screws, Eirich mixers, sigma-type kneaders or rotary tubes.

The condensation products in accordance with the invention make excellent nitrogenous fertilizers. They may be applied in a single very high dose, for example 300 to 500 kg. N/ha., for fertilizing agricultural and horticultural areas, for example for cereals, vegetables or lawn, without damage to the plants. They give off their nitrogen content to the plants gradually in the course of a vegetation period.

The following examples serve to illustrate the invention but they are not intended to limit it thereto.

Example 1

In an Eirich mixer, 24 kg. of urea were combined within 2.5 hours, while stirring, with 13 kg. of isobutyraldehyde of 95% strength, 3.5 kg. of formaldehyde of 30% strength, 500 cc. of sulfuric acid of 50% strength and 2.2 litres of water. A granulated co-condensate was obtained, which was dried for 2 hours at 110° C. in a drying chamber.

The product had a nitrogen content of 33.1%. According to the analysis method of Kralovec and Morgan (cf. Journal of Agricultural and Food Chemistry 2, 92 (1954)), 59% of the nitrogen was readily soluble in water, 38% difficultly soluble in water and 3% insoluble in water.

Example 2

24 kg. of urea were ground together with 1.05 kg. of paraformaldehyde in a hammer mill and then combined within 3 hours in an Eirich mixer with 12.4 kg. of isobutyraldehyde of 95% strength, 500 cc. of sulfuric acid of 50% strength and 1.8 litres of water while incorporating 8 kg. of undried return material, i.e. reaction product, from a previou batch of the same kind and the whole was caused to react. A granulated round-grained co-condensate was obtained, which was dried for 2 hours at 115° C. in a drying chamber.

The product had a nitrogen content of 34.3% of which 54% was readily soluble, 44% difficultly soluble and 2% insoluble in water.

Example 3

48 kg. of ground urea, 1.1 kg. of paraformaldehyde, 28.5 kg. of commercial isobutyraldehyde of 95% strength and 50 kg. of ground return material from a previous batch of the same kind were introduced within 2 hours into the head end of a closed granulating screw. The reaction mixture was mixed with 500 cc. of sulfuric acid of 50% strength at the head of the screw and with a total of 6 litres of water in the middle portion of the screw, the sulfuric acid and the water being introduced through nozzles. The liberated heat of reaction was eliminated with the help of a cooling jacket.

The granulated co-condensate was removed continuously at the foot of the screw. It was introduced into a rotary tube, dried at 115° C. and finally sieved on a swing sieve.

A product having a nitrogen content of 32.6% was obtained. Of the nitrogen, 47.5% readily soluble, 52.0% difficulty soluble and 0.5% insoluble in water.

We claim:

1. A grandulated cocondensate of (a) urea, (b) propionaldehyde or butyraldehyde, and (c) formaldehyde, the ratio of the (a), (b), and (c) components in the condensate being in a mole ratio of $2:0.8-n$ to $2-n:n$, and wherein $n$, in moles, is from 0.05 to 1.

2. A process for the manufacture of granulated cocondensates of (a) urea, (b) a saturated aldehyde of 3 to 4 carbon atoms, and (c) formaldehyde which comprises condensing in a granulating apparatus while keeping the reaction mixture in a plastic phase throughout the entire reaction the (a), (b), and (c) components in the mole ratio of $2:0.8-n$ to $2-n:n$, wherein $n$ in moles is from 0.05 to 1.

3. A process according to claim 2 wherein formaldehyde is used as paraformaldehyde in a solid form.

4. A process according to claim 2 wherein the formaldehyde is used as an aqueous formaldehyde solution.

References Cited

UNITED STATES PATENTS

| | | | |
|---|---|---|---|
| 2,729,611 | 1/1956 | Chesley et al. | 71—28 |
| 2,766,283 | 10/1956 | Darden | 260—69 |
| 3,198,761 | 8/1965 | O'Donnell | 260—69 |
| 3,219,432 | 11/1965 | Schafer et al. | 71—28 |

FOREIGN PATENTS 419,422 4/1944 Canada.

OTHER REFERENCES

Chem. Abstract, vol. 54, 11583i, Water-Soluble Curing Urea Resins, Kohler et al.

WILLIAM H. SHORT, *Primary Examiner.*

E. M. WOODBERRY, *Assistant Examiner.*

U.S. Cl. X.R.

71—28